(12) United States Patent
Glimm

(10) Patent No.: US 7,973,916 B2
(45) Date of Patent: *Jul. 5, 2011

(54) INCLINATION DETECTION METHODS AND APPARATUS

(75) Inventor: Andreas Glimm, Weimar (DE)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/658,661

(22) Filed: Feb. 14, 2010

(65) Prior Publication Data

US 2010/0195094 A1 Aug. 5, 2010

Related U.S. Application Data

(63) Continuation of application No. 12/214,157, filed on Jun. 16, 2008, now Pat. No. 7,688,433, which is a continuation of application No. 11/329,751, filed on Jan. 10, 2006, now Pat. No. 7,388,658.

(60) Provisional application No. 60/643,513, filed on Jan. 12, 2005.

(51) Int. Cl.
*G01C 1/00* (2006.01)
(52) U.S. Cl. .................................. 356/139.1
(58) Field of Classification Search ............. 356/139.1; 33/366.12, 366.16, 366.23
See application file for complete search history.

(56) References Cited

U.S. PATENT DOCUMENTS

| 4,159,422 | A | 6/1979 | Okubo |
| 4,993,162 | A | 2/1991 | Scholian |
| 5,371,951 | A | 12/1994 | Piske |
| 5,392,112 | A | 2/1995 | Nakamura |
| 5,933,393 | A | 8/1999 | Kitajima |
| 6,088,090 | A | 7/2000 | Hoshi et al. |
| 6,138,367 | A | 10/2000 | Raby |
| 6,320,653 | B1 | 11/2001 | Feist |
| 7,408,626 | B2 | 8/2008 | Greco |
| 7,692,777 | B1 * | 4/2010 | Monz et al. ............... 356/139.1 |

FOREIGN PATENT DOCUMENTS

| DE | 36 34 244 A1 | 4/1988 |
| DE | 196 10 941 A1 | 9/1997 |
| EP | 1 245 926 A2 | 10/2002 |
| WO | WO 99/57513 | 11/1999 |
| WO | WO 2004/113835 A1 | 12/2004 |
| WO | WO 2006/074929 A1 | 7/2006 |

OTHER PUBLICATIONS

PCT/EP2006/000225 International Search Report.
PCT/EP2006/000225 Written Opinion of the International Searching Authority.

* cited by examiner

*Primary Examiner* — Isam Alsomiri
(74) *Attorney, Agent, or Firm* — Bruce D Riter

(57) ABSTRACT

Apparatus and methods for detecting inclination employ a point source of light from which light is emitted through a lens toward a reflective surface of a liquid contained in a vessel. Light reflected from the surface passes through the lens to form a defocused image of the point source on a two-dimensional array of detector elements. Data acquired from the array represents intensity of the light incident on each of the detector elements. A center of gravity representing inclination of the vessel is determined from the data.

24 Claims, 8 Drawing Sheets

INCLINATION DETECTION METHODS AND APPARATUS

RELATED APPLICATION DATA

This application is a continuation of and claims benefit under 35 U.S.C. §120 of U.S. application Ser. No. 12/214,157, filed Jun. 16, 2008 now U.S. Pat. No. 7,688,433, the content of which is incorporated herein by this reference, which in turn is a continuation of and claims benefit under 35 U.S.C. §120 of U.S. application Ser. No. 11/329,751, filed Jan. 10, 2006, now U.S. Pat. 7,388,658, the content of which is incorporated herein by this reference, which in turn claims benefit under 35 U.S.C. §119(e) of prior U.S. provisional application Ser. No. 60/643,513, filed Jan. 12, 2005, the content of which is incorporated by this reference.

FIELD OF THE INVENTION

The invention relates to methods and apparatus for detecting inclination, particularly for detecting inclination of a geodetic instrument such as a total station.

BACKGROUND

Some inclination detectors use liquid in a vessel to determine deviation from true vertical by measuring the gravity vector. A light beam from a source is reflected on the surface of the liquid. The reflected light beam is incident on a detector. The location of incidence on the detector changes as the vessel is inclined.

Using a CCD line as a sensor, the location where the reflected beam strikes the detector can be provided as an output signal. Using two such detectors orthogonal to one another in a chevron pattern, the inclination in two orthogonal directions can be detected, as in U.S. Pat. No. 6,088,090.

WO 99/57513 shows a two-axis inclination detector having two light sources and two CCD lines, with a single, large, plano-convex ball lens. The diameter and height of this configuration are too large for many applications.

DE 196 10 941 A1 shows an inclination detector using an area sensor.

U.S. Pat. No. 4,159,422 shows a displacement sensor using a light-emitting diode and photocells which generate output signals proportional to radiation reflected from a pool of mercury.

Inclination detector improvements are needed which will provide for smaller overall size, low overall height, low cost, compatibility with modern sensor and data interface technologies, scalability for use in various applications with differing demands on working range, accuracy and size, and/or semi-automated manufacture.

SUMMARY

In accordance with embodiments of the invention, apparatus and methods for detecting inclination employ a point source of light from which light is emitted through a lens toward a reflective surface of a liquid contained in a vessel. Light reflected from the surface passes through the lens to form a defocused image of the point source on a two-dimensional array of detector elements. Data acquired from the array represents intensity of the light incident on each of the detector elements. A center of gravity representing inclination of the vessel is determined from the data.

Embodiments of apparatus in accordance with the invention can comprise: a vessel containing liquid having a reflective surface, a lens situated in an optical path between the reflective surface and a focal plane of the lens, a point source to emit light through the lens toward the liquid surface, a two-dimensional array of detector elements located such that light reflected from the reflective surface passes through the lens onto the detector elements, each detector element producing a value corresponding to amplitude of incident light, and a processor responsive to the values produced by the detector elements to calculate a center of gravity of the image formed on the detector elements, wherein the calculated center of gravity is dependent on inclination of the vessel.

Apparatus in accordance with embodiments of the invention can include one or more additional features. The light can form an image of the point source on the detector elements. One or both of the light source and the array can lie substantially out of the focal plane of the lens such that the image formed on the detector elements is a defocused image of the point source. The processor can calculate the center of gravity with sub-pixel precision. The calculated center of gravity can depend on inclination of the vessel about two orthogonal axes. The lens can have a non-planar surface in contact with the liquid. A prism can be located in the optical path between the point source and the reflective surface and serving to direct light from the point source toward the liquid surface. The prism can serve to direct light from the reflective surface toward the two-dimensional array.

The processor can be responsive to values produced by the detector elements which exceed a threshold for calculating the center of gravity of the image formed on the detector elements. The apparatus can further comprise a sensor producing a signal dependent on ambient temperature, wherein the processor is responsive to the signal for applying a temperature correction when calculating the center of gravity of the image formed on the detector elements. The processor can be responsive to the values produced by the detector elements over a predetermined time interval to calculate a center of gravity of the image formed on the detector elements averaged over the predetermined time interval. The processor can be responsive to user selection of the predetermined time interval. The processor can control emission of light from the point source. The detector elements can comprise CMOS photodiodes.

Apparatus in accordance with embodiments of the invention can further comprise a base, an alidade mounted on the base for rotation about a support axis, and a telescope unit rotatably mounted on the alidade for rotation about an elevation axis. The apparatus can further comprise an azimuth sensor for detecting rotational orientation of the alidade and an elevation sensor for detecting rotational orientation of the telescope unit. The processor can further be responsive to the azimuth sensor and to the elevation sensor for generating rotation control signals, and drives responsive to the rotation control signals for orienting the alidade and the telescope unit.

The processor can use the calculated center of gravity to determine at least one of (i) a correction for deviation from plumb of an axis of the apparatus, and (ii) a correction for collimation errors. The processor can use the calculated center of gravity to determine at least one of: (i) an aiming compensation, (ii) a vertical line extension, and (iii) a horizontal line extension. The telescope unit can comprise a distance measurement module for measuring distance to a target remote from the apparatus. The telescope unit can comprise a telescope and a servo focus module for optical focusing of the telescope. The telescope unit can comprise a tracker for detecting orientation of the telescope unit relative to a remote target, wherein the processor is responsive to the tracker for generating rotation control signals to orient the alidade and the telescope unit such that the telescope unit maintains the remote target along an optical path of the telescope. The apparatus can further comprise a radio for communicating information between the processor and a remote control unit. The apparatus can further comprise at least one input device and at least one display.

Method of determining inclination in accordance with embodiments of the invention can comprise: emitting light from a point source through a lens toward a reflective liquid surface contained in a vessel; detecting light incident on an array of detector elements which is reflected from the liquid surface and passes through the lens to form a defocused image of the point source on the array to acquire data representing detected intensity of the light incident on each of the detector elements; and determining a center of gravity from the data, the center of gravity representing inclination of the vessel.

Methods in accordance with embodiments of the invention can include one or more additional features. A temperature value representing ambient temperature can be acquired, and determining a center of gravity from the data can comprise applying the temperature value to determine a center of gravity which is corrected for ambient temperature. Detecting light to acquire data can comprise acquiring data in data sets and collecting multiple data sets to obtain a frame of data, and determining a center of gravity can comprise computing a center of gravity from a frame of data. Determining a center of gravity can comprise averaging data acquired over a selected time interval. Methods can further comprise generating a display of the center of gravity as a representation of inclination of the vessel about two orthogonal axes. Methods can further comprise correcting tilt sensitivity for ambient temperature.

DETAILED DESCRIPTION

Figure 1:
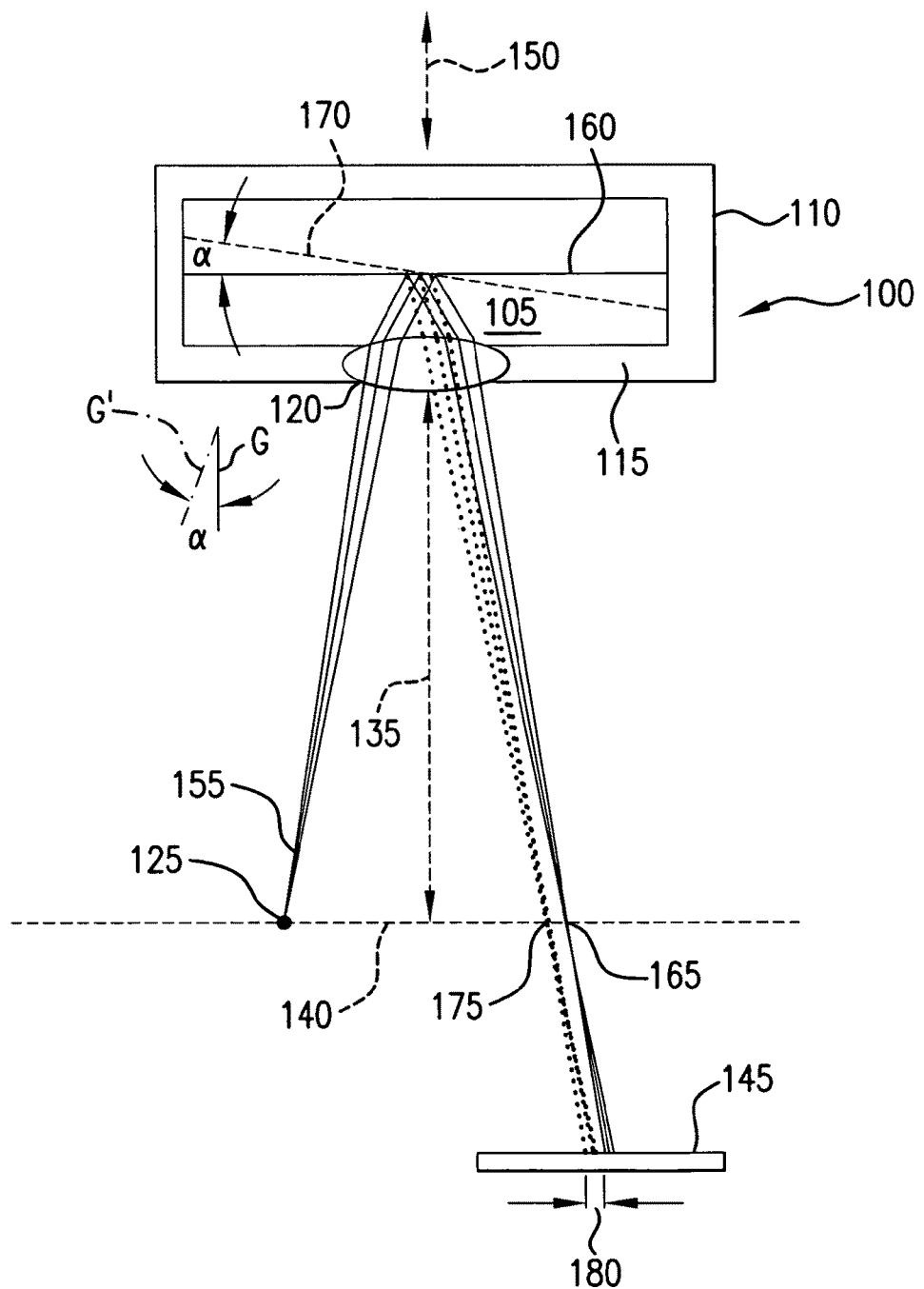
FIG. 1 schematically illustrates an inclination detector in accordance with an embodiment of the invention.

FIG. 1 schematically illustrates an inclination detector 100 in accordance with an embodiment of the invention. FIG. 1 is not drawn to any particular scale, and relative dimensions are exaggerated to illustrate operating principles. A fluid 105 is contained in a vessel 110 having a floor 115 fitted with a lens 120. A light source 125 is located at the focal length 135 of lens 120 in focal plane 140. A detector array 145 is located out of the focal plane 140 of lens 120. Inclination detector 100 is mounted, for example, on the center line 150 of a geodetic instrument, not shown in FIG. 1.

Fluid 105 is, for example, silicon oil having an index of refraction $n_S$ of about 1.4. Lens 120 is, for example, of glass having an index of refraction $n_G$ of about 1.5, and collimates the light from light source 125 to infinity. Light source 125 is a point-light source, such as a light-emitting diode having an emission area of about 150 μm diameter.

Rays 155 from light source 125 pass through lens 120 and fluid 105, are reflected from the upper surface of liquid 105, and pass through fluid 105 and lens 120 to detector array 145. Light rays incident on detector array 145 are detected and converted to a detector signal.

Figure 2:
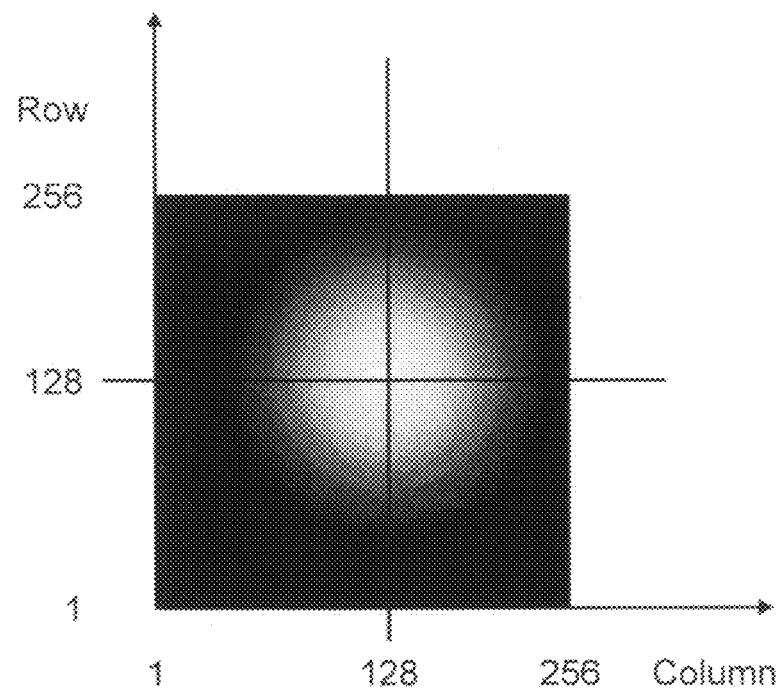
FIG. 2 shows an out-of-focus spot of light incident on a detector array in accordance with an embodiment of the invention.

In a quiescent state, the upper surface of liquid 105 is orthogonal to the vector of gravity. When inclination detector 100 is level, the upper surface of liquid 105 is as shown at 160 and the relative orientation of the gravity vector as indicated at G. Rays 165 reflected from the upper surface of liquid 105 are focused to a point at the focal plane 140 of lens 120. As detector array 145 is located out of the focal plane of lens 120, the rays incident on detector array 145 produce an defocused image of light source 125 (a spot of light rather than a point), an example of which is shown in FIG. 2.

When inclination detector 100 is tilted at an angle α, the upper surface of liquid 105 is correspondingly tilted in vessel 110 as shown by the dashed line at 170 and the relative orientation of the gravity vector is as indicated at G'. The corresponding angular tilt a of the upper surface of liquid 105 relative to the rays incident on the upper surface of liquid 105 causes a shift in the reflection angle so that the rays incident on detector array 145 as indicated by the dotted ray lines 175 produce a defocused image of light source 125 which is shifted in position on the surface of detector array 145. The position shift is represented schematically at 180 in FIG. 1. The position shift of the image on detector array 145 can occur in either or both of two orthogonal directions.

In an embodiment, detector array 145 is a two-dimensional array of N rows and M columns of detector elements, for example 256 rows and 256 columns of detector elements. FIG. 2 shows a spot of light incident on detector array 145, the spot of light being a defocused image of light source 125 because detector array 145 lies out of the focal plane 140 of lens 120. In the image of FIG. 2, the center of the spot of light is centered on the detector array, e.g., at row 128 of 256 and at column 128 of 256. The center of the spot of light is displaced on the detector array when the tilt angle α of inclination detector 100 is changed.

Figure 3:
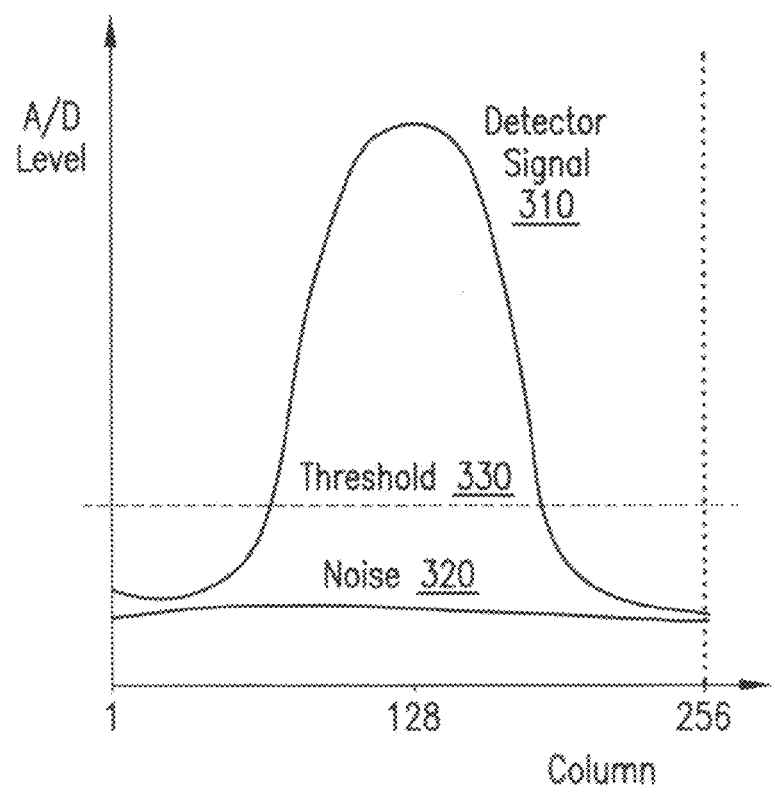
FIG. 3 shows amplitude of a detector signal from a row of detector array elements intersecting a spot of light incident on a detector array.

FIG. 3 shows amplitude of a detector signal from a row of detector array elements intersecting a spot of light incident on a detector array. For example, the detected amplitude (A/D level) of light incident on respective detector elements of a row of detector array 145 lying near the center of the spot of light (e.g., row 128 of 256) will have a distribution substantially as shown at 310. The detected amplitude (A/D level) of light incident on respective detector elements of a row of detector array lying outside the spot of light (e.g., row 1 or row 256 of 256) will have a distribution substantially as shown at 320, this level being due to factors such as light reflected from the interface between lens 120 and liquid 105 and thus considered background noise. Background noise can arise from other factors as well. Preferably the signal from detector array 145 is filtered by applying a threshold 330 so that the portion of detector signal 130 representing the spot of light is retained and the background noise is rejected. Examples of acquisition and processing of the signal from detector array 145 are given below.

Figure 4:
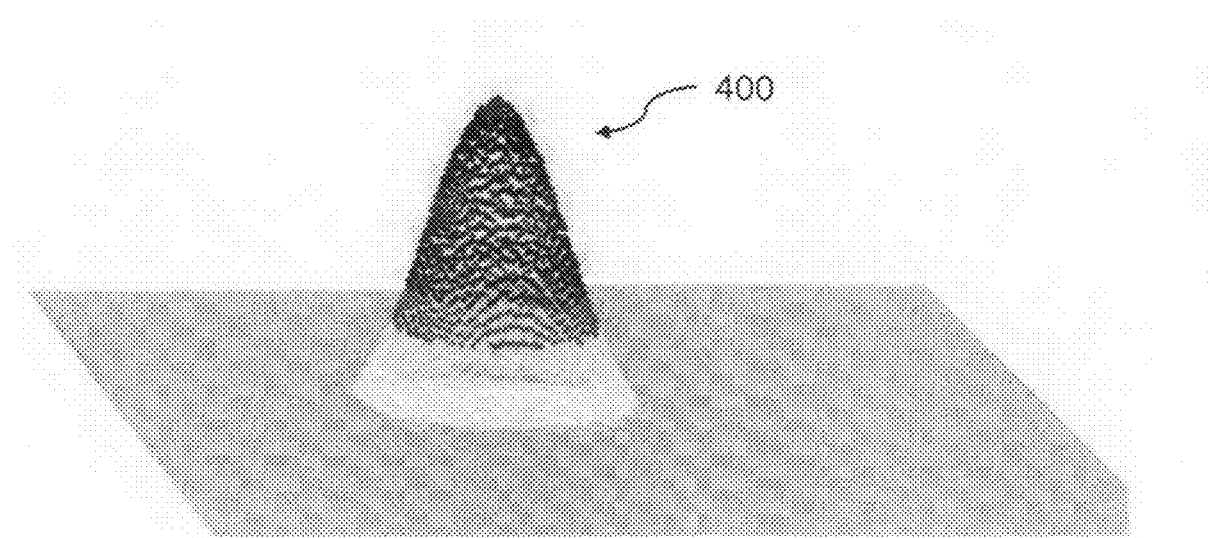
FIG. 4 is a three-dimensional perspective representation of the detected amplitude distribution corresponding to FIG. 2 and FIG. 3.

FIG. 4 shows a three-dimensional perspective representation 400 of the detected amplitude distribution corresponding to FIG. 2 and FIG. 3.

Figure 5:
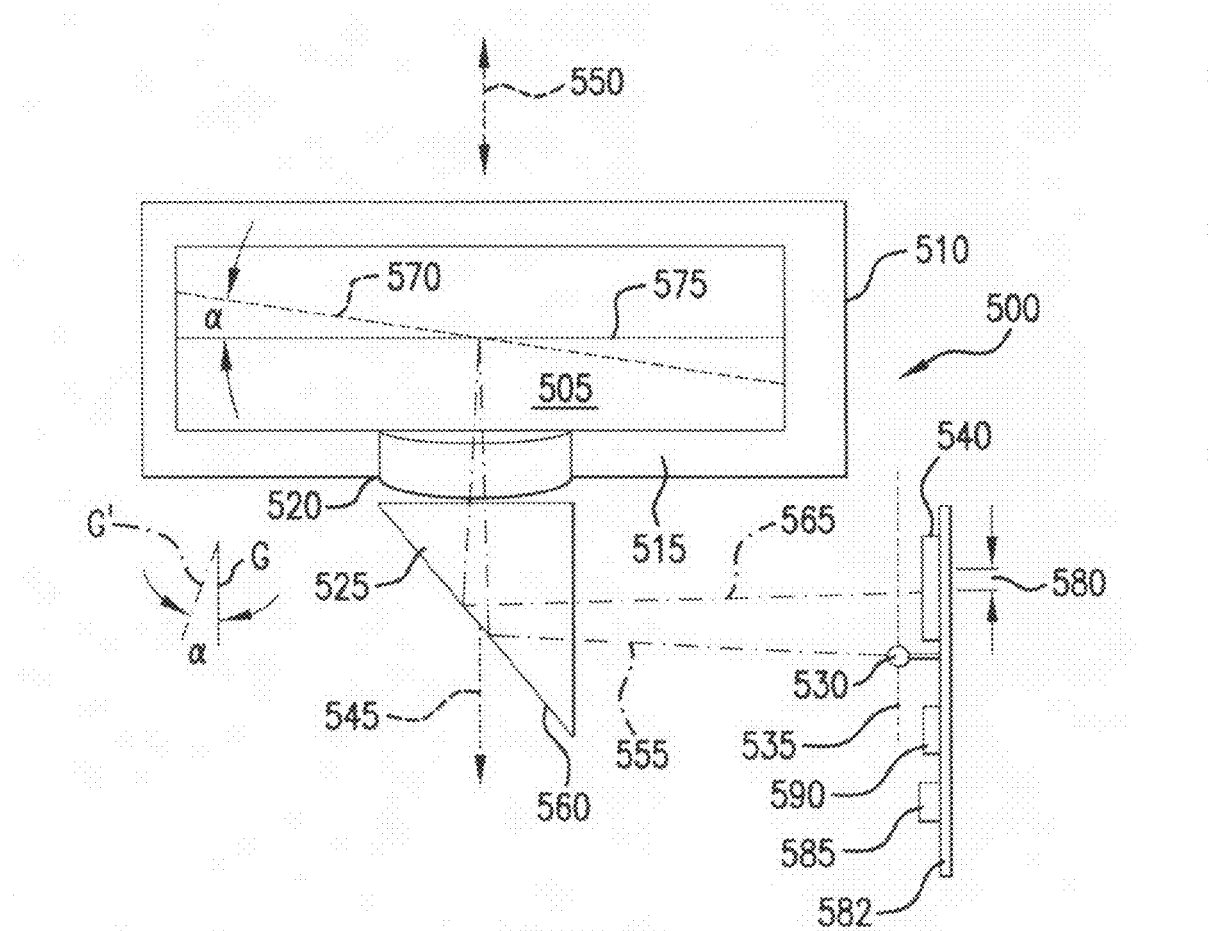
FIG. 5 shows a second embodiment of an inclination detector in accordance with the invention.

FIG. 5 shows an embodiment of an inclination detector 500 in accordance with the invention which employs a prism to reduce the height of the apparatus by folding the light beam and placing the light source and detector array to the side of the vessel. FIG. 5 is not drawn to any particular scale, and relative dimensions are exaggerated to illustrate operating principles. This configuration has a laterally small size while retaining the capability to measure inclination about two orthogonal axes. A fluid 505 is contained in a vessel 510 having a floor 515 fitted with a lens 520 and a prism 525. A light source 530 is located at the focal length of lens 520 in focal plane 535. A detector array 540 is located out of the focal plane 535 of lens 520. Inclination detector 500 is mounted, for example, with its optical plumb path 545 substantially aligned with the center line 550 of a geodetic instrument, not shown in FIG. 5.

Fluid 505 is, for example, silicon oil having an index of refraction $n_S$ of about 1.4. Lens 520 and prism 525 are, for example, of glass having an index of refraction $n_G$ of about 1.5. Lens 520 collimates the light from light source 530 to infinity. Light source 530 is a point-light source, such as a light-emitting diode having an emission area of about 150 μm diameter.

Rays 555 from light source 530 pass through prism 525, are reflected from surface 560 of prism 525, and pass through lens 520 and fluid 505 to the upper surface of liquid 505. Rays 565 reflected from the upper surface of liquid 505 pass through fluid 505, lens 520 and prism 525, are reflected from surface 560 of prism 525, and pass through prism 525 to detector array 540. Light rays incident on detector array 540 are detected and converted to a detector signal.

In a quiescent state, the upper surface of liquid 505 is orthogonal to the vector of gravity. When inclination detector 500 is level, the upper surface of liquid 505 is as shown at 575 and the relative orientation of the gravity vector as indicated at G. Rays 565 reflected from the upper surface of liquid 505 are focused to a point at the focal plane 535 of lens 520. As detector array 540 is located out of the focal plane of lens 520, rays incident on detector array 540 produce a defocused image of light source 530 (a spot of light rather than a point), for example as shown in FIG. 2.

When inclination detector 500 is tilted at an angle α, the upper surface of liquid 505 is correspondingly tilted in vessel 510 as shown by the dashed line at 570 and the relative orientation of the gravity vector is as indicated at G'. The corresponding angular tilt a of the upper surface of liquid 505 relative to the rays incident on the upper surface of liquid 505 causes a shift in the reflection angle so that the rays incident on detector array 540 produce a defocused image of light source 530 which is shifted in position on the surface of detector array 540. The position shift is represented schematically at 580 in FIG. 5. The position shift of the image on detector array 540 can occur in either or both of two orthogonal directions.

In the embodiment of FIG. 5, light source 530 and detector array 540 are mounted on a circuit board 582 with various signal processing components shown for example as 585 and 590.

Figure 6:
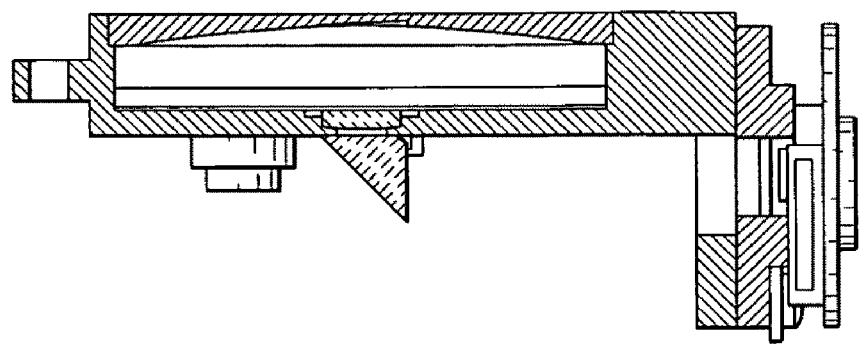
FIG. 6 is a sectional view of an inclination detector module in accordance with an embodiment of the invention.

FIG. 6 is a sectional view of an inclination detector module in accordance with an embodiment of the invention.

Figure 7:
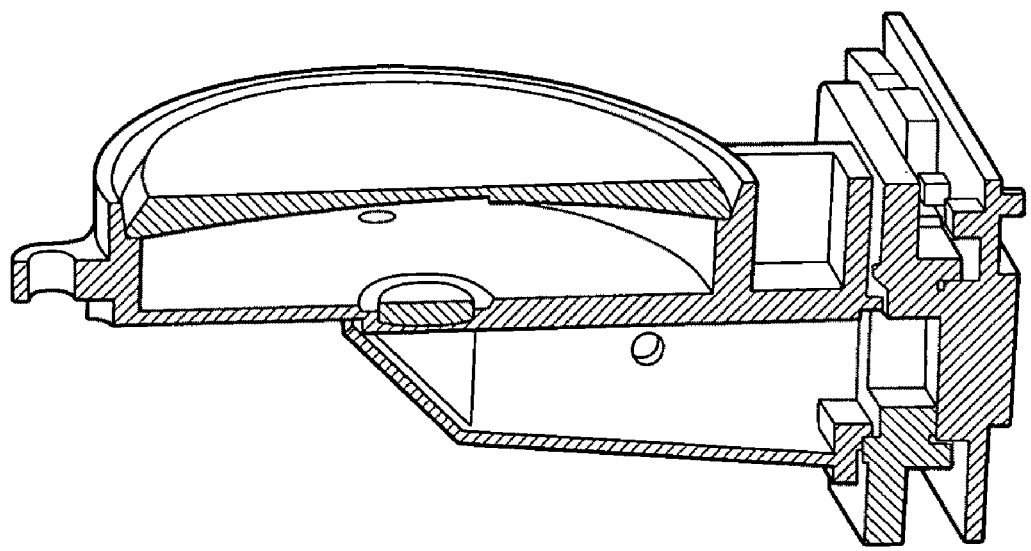
FIG. 7 is a cutaway perspective view of the inclination detector module of FIG. 6.

FIG. 7 is a cutaway perspective view of the inclination detector module of FIG. 6.

Figure 8:
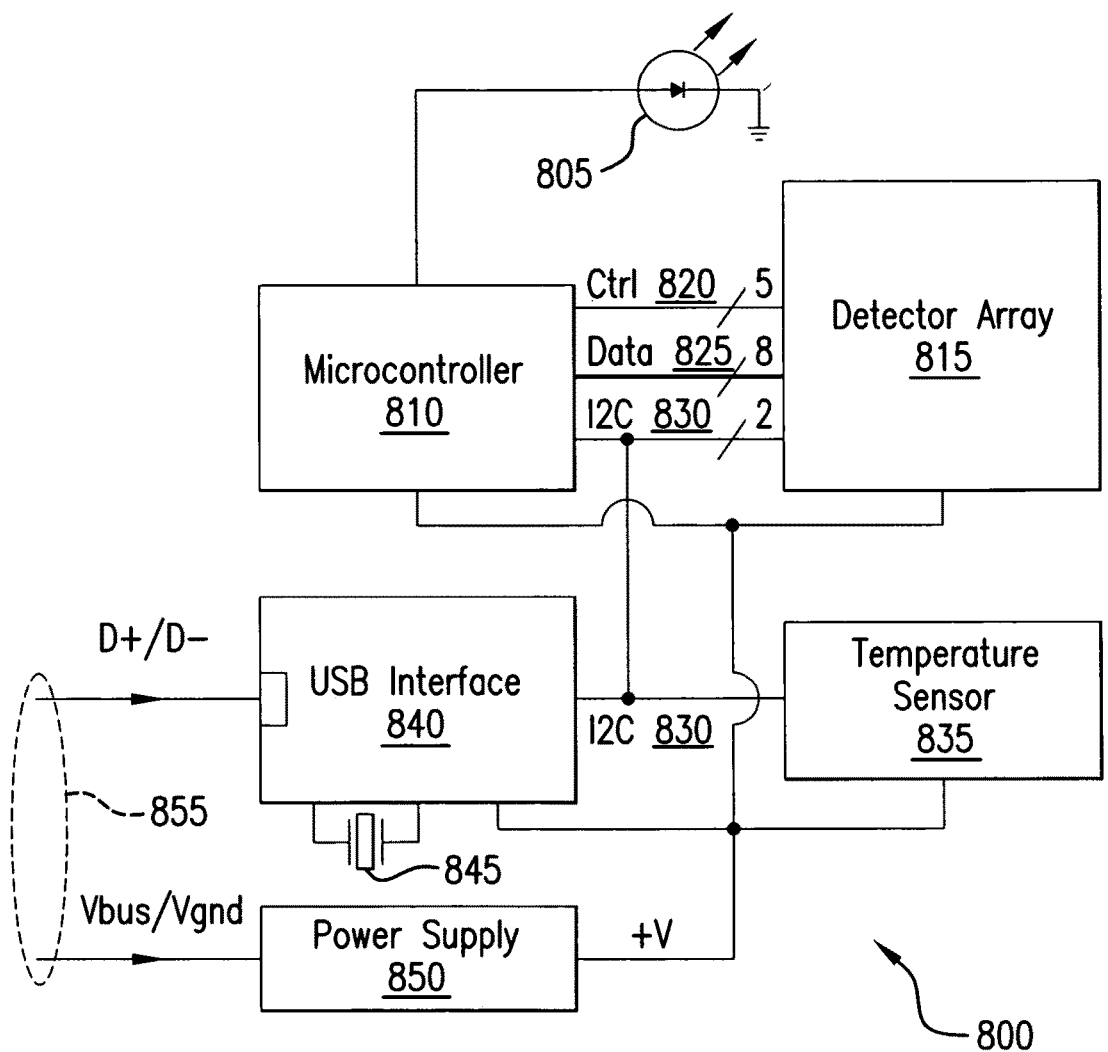
FIG. 8 is a schematic diagram of a signal-processing circuit 800 useful in an inclination detector in accordance with embodiments of the invention.

FIG. 8 is a schematic diagram of a signal-processing circuit 800 useful in an inclination detector in accordance with embodiments of the invention. A point-light source such as light-emitting diode 805 emits light in response to a control signal from a microcontroller 810. Light rays from diode 805 are reflected from the surface of liquid in a vessel as described above, and the reflected rays form a defocused image of the emission area of diode 805 on a detector array 815. Microcontroller 810 communicates with detector array 815 via control lines 820, data lines 825 and an inter-integrated-circuit (I2C) bus 830. A temperature sensor 835 and a universal-serial-bus (USB) interface 840 also communicate with microcontroller 810 via I2C bus 830. A power supply 850 provides power to operate microcontroller 810 and diode 805, detector array 815, temperature sensor 835 and USB interface 840. USB interface 840 allows for communication of inclination measurement signals via a USB connector 855 to an external processor or display, not shown in FIG. 8. Power supply 850 is powered for example via USB connector from an external source not shown in FIG. 8.

Detector array 815 can be any suitable image sensor, many of which are commercially available, such as the ADCS series Agilent CMOS Image Sensors available commercially from Agilent Technologies, Inc. These integrate an array of sensitive photodiode elements with timing control and on-board analog-to-digital (A/D) converter. The window size can be programmed from the full array (e.g., 640×480 pixels) down to 4×4 pixels, or some value in between such as 256×256 pixels. Integrated timing control provides row and column addressing, and programmable exposure control, frame rate and data rate. Microcontroller 810 can be any suitable device such as an AVR 8-bit RISC device available commercially from Atmel Corporation. Light-emitting diode 805 can be any suitable device such as a point-source diode model PL15-R available commercially from ELCOS GmbH.

Inclination of the inclination detector is determined by computing the center of gravity of the light spot incident on the detector array. Inclination in the direction of the rows of photodiode elements of the detector array is determined for example from the relation:

$$U(r)=p(r)\times[r\times A(c,r)]/[A(c,r)]+U_0(r)$$

where U(r) is the inclination in the direction of the rows, $U_0(r)$ is the level point error in the direction of the rows, p(r) is sensitivity in the direction of the rows, r is the row ordinal number, c is the column ordinal number, A(c,r) is the A/D value of the pixel at row c and column r, and [ . . . ] is the sum over all pixels. Inclination in the direction of the columns of photodiode elements of the detector array is determined for example from the relation:

$$U(c)=p(c)\times[c\times A(c,r)]/[A(c,r)]+U_0(c)$$

where U(c) is the inclination in the direction of the columns, $U_0(c)$ is the level point error in the direction of the columns, p(c) is sensitivity in the direction of the columns, r is the row ordinal number, c is the column ordinal number, A(c,r) is the A/D value of the pixel at row c and column r, and [ . . . ] is the sum over all pixels.

Tilt sensitivity p(c), p(r) depends on focal length of the optics and on pixel spacing. Sensitivity to incident light intensity is regulated, for example to a level of 150 (of 256 levels in an 8 bit configuration) so as to use the linear range of photodiode sensitivity to incident light.

Thresholding is performed for noise rejection, for example, by using only the values (A/D levels) from photodiode elements which are above a desired limit.

Temperature sensor 835 is optionally provided for calibration of the inclination detector circuit. The refractive index of the fluid changes with temperature, causing the level point $U_0(r)$, $U_0(c)$ of the inclination detector to change; thus, it is desirable to provide temperature calibration for use of the inclination detector under a wide range of ambient temperatures. It is also possible to correct the tilt sensitivity $p(c)$, $p(r)$ with temperature. Correction constants can be measured in a climate chamber and stored in microcontroller 810, so that when the inclination detector is in use microcontroller 810 can obtain an ambient temperature value from temperature sensor 635 and calculate inclination values $U(r)$, $U(c)$ based on level-point error values $U_0(r)$, $U_0(c)$ appropriate to the ambient temperature.

Microcontroller 810 controls the operating modes of detector array 815 via I2C bus 830, and also transmits calculated inclination values via I2C bus 830 to USB interface 840. Microcontroller 810 controls light intensity levels by controlling current to light-emitting diode 805 and/or by controlling exposure time. Light-emitting diode 805 can be illuminated continuously if desired, or can be pulsed to provide finer control over light output. For example, if microcontroller 810 allows 15 current levels, it is possible to obtain finer current control by pulsing current to light-emitting diode 805 to obtain intermediate levels of light output. One possible scheme is to pulse with a period of 8-10 ms and provide 8 steps between each current level (from 0 pulses on and 8 pulses off, to 8 pulses on and 0 pulses off).

In an embodiment, microcontroller 810 sends a start command via I2C bus 830 to detector array 815. In operation, detector array 815 continuously loops through the programmed photodiode array (e.g., 256×256) and transmits to microcontroller 810 via data bus 825 an 8-bit level value for each photodiode. When microcontroller 810 has acquired a frame of information it calculates inclination values and transmits the calculated inclination values via I2C bus 830 to USB interface 840 for retransmission via USB cable 855.

In an embodiment, microcontroller 810 thus continuously receives data from detector array 815 and transmits a fresh set of calculated inclination values for each new frame of data. Frequent updating of the inclination measurement is desirable for use in instruments under rough ambient conditions, for example at construction sites where the instrument is subject to shock and vibration.

Under rough ambient conditions it is desirable to program the detector array for a high exposure time to avoid loss of information. In an embodiment, exposure strength is regulated by regulating the current applied to light-emitting diode 805 such that exposure time is matched to the time needed for detector array 815 to transmit one frame of data (e.g., 256 lines). In an embodiment, exposure time is the time between clearing a line by resetting charge of the photodiodes of this line to a starting level and the time of reading out the data of the photodiodes of this line in mulitples of line numbers. This fixed number of lines can range from one to some larger number such as five or more lines.

In an embodiment, calculation of inclination values is a rolling process in which data is processed with a delay of one frame or a delay of one exposure time interval. In an embodiment, data is acquired at a rate of 0.2 seconds per frame and microcontroller 810 calculates five sets of inclination values per second. In an embodiment, data is acquired continuously while microcontroller 810 calculates inclination values as averages over the exposure time, such as 0.2 seconds. In an embodiment, inclination values are calculated as averages over a period of multiple frames, the calculation occurring either in microcontroller 810 or in a separate controller (not illustrated) of an instrument which comprises an inclination detector in accordance with the invention.

In embodiments, the choice of such parameters as diode current, exposure time, averaging intervals and the like is based on the intended use, expected vibration conditions, ambient temperature, expected movement of the instrument which disturbs the quiescent state of fluid in the vessel and/or other considerations. For example, when a human operator is manually leveling an instrument it is undesirable to average inclination measurements over a long period because the human operator will want to see the measurements change promptly as the manual leveling occurs. Once the manual leveling operation is complete, the human operator may wish to change to a mode in which averaging occurs over multiple frames (e.g., over a period of three seconds) for improved measurement accuracy. An instrument can therefore offer different modes of operation to be selected by the human operator.

Embodiments in accordance with the invention can have one or more of the following characteristics. First, the light beam is incident on the liquid surface at an angle near 90 degrees. Prior-art arrangements using CCD-line detectors have an incidence angle of about 45 degrees for total reflection of incident light so as to provide greater light energy. Area sensors such as CMOS photodiode arrays require less energy so about 2.5% reflected energy is sufficient. The greater incidence angle allows for a more compact inclination detector configuration.

Second, the light source is a dot source. A dot source can be used because the detector array comprises highly-sensitive elements (e.g., CMOS diodes) and an internal analog-to-digital converter providing data from which it is possible to compute the center of weight of the detected signal with sub-pixel precision. Pixel size (photodiode spacing) is, for example, 7 µm.

Third, the image of the dot on the detector array is defocused by placing the detector array (and/or the light source) out of the focal plane of the lens. For example, the image on the detector array of the dot from a dot source of about 150 µm diameter is defocused to an area of about 250 µm. For high precision in computing the center of gravity of the image it is advantageous to not have a sharp image edge. Edges of a Gaussian distribution of pixel amplitudes (photodiode levels) are used to calculate the center of gravity of the dot image with sub-pixel precision. With a processor (microcontroller) in the sensor package, the center of gravity of the image is calculated in real time.

Fourth, the lens surface in contact with the liquid (e.g. the upper surface of lens 120 in contact with liquid 105 and the upper surface of lens 520 in contact with liquid 505) is non-planar. As the light from the dot source is incident at an angle nearly orthogonal to the upper surface of the liquid, signal is low due to the low reflection index (e.g., about 2.5%). A planar upper lens surface would cause a reflection at the lens/liquid interface tending to increase noise in the central region of the spot incident on the detector array. A convex or concave upper lens surface tends to disperse the reflection occurring at the lens-liquid interface over a wider area, tending to produce a higher signal-to-noise ratio in the area of interest (the center of the spot of light incident on the detector array). The active focusing surface of the lens is convex and the inactive surface of the lens in contact with the liquid is convex (as in FIG. 1) or concave (as in FIG. 5).

In an embodiment, the focal plane is located a single focal length after the lens. In an embodiment, at least one of the light source and the detector array lie out of the focal plane so that the image of the light source incident on the detector array is defocused, e.g., with a Gaussian distribution. In an embodiment, the entire aperture is employed.

In an embodiment, the lens is not in contact with the liquid but is placed near the liquid and a window is provided for passage of light from the dot source through the lens and the window into the liquid and back through the window and lens to the detector array. If a window is provided, in an embodiment the window surface in contact with the liquid is nonplanar (e.g., convex or concave).

Embodiments in accordance with the invention include geodetic instruments incorporating an inclination detector. For example, FIG. 9 shows a partial sectional elevation view of a total station in accordance with an embodiment of the invention and FIG. 10 is a functional block diagram of such a total station.

Figure 9:
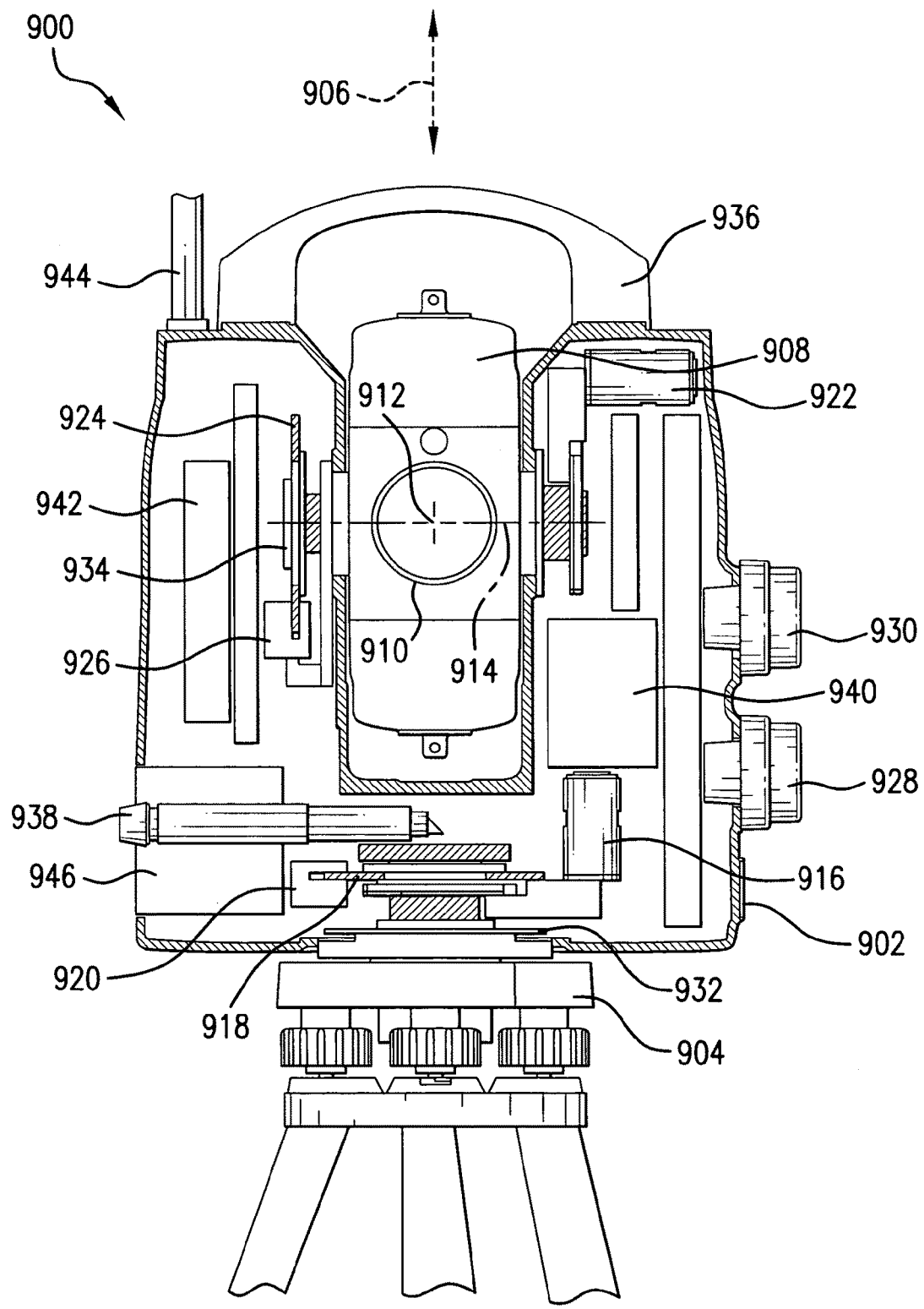
FIG. 9 shows a partial sectional elevation view of a total station in accordance with an embodiment of the invention.
Figure 10:
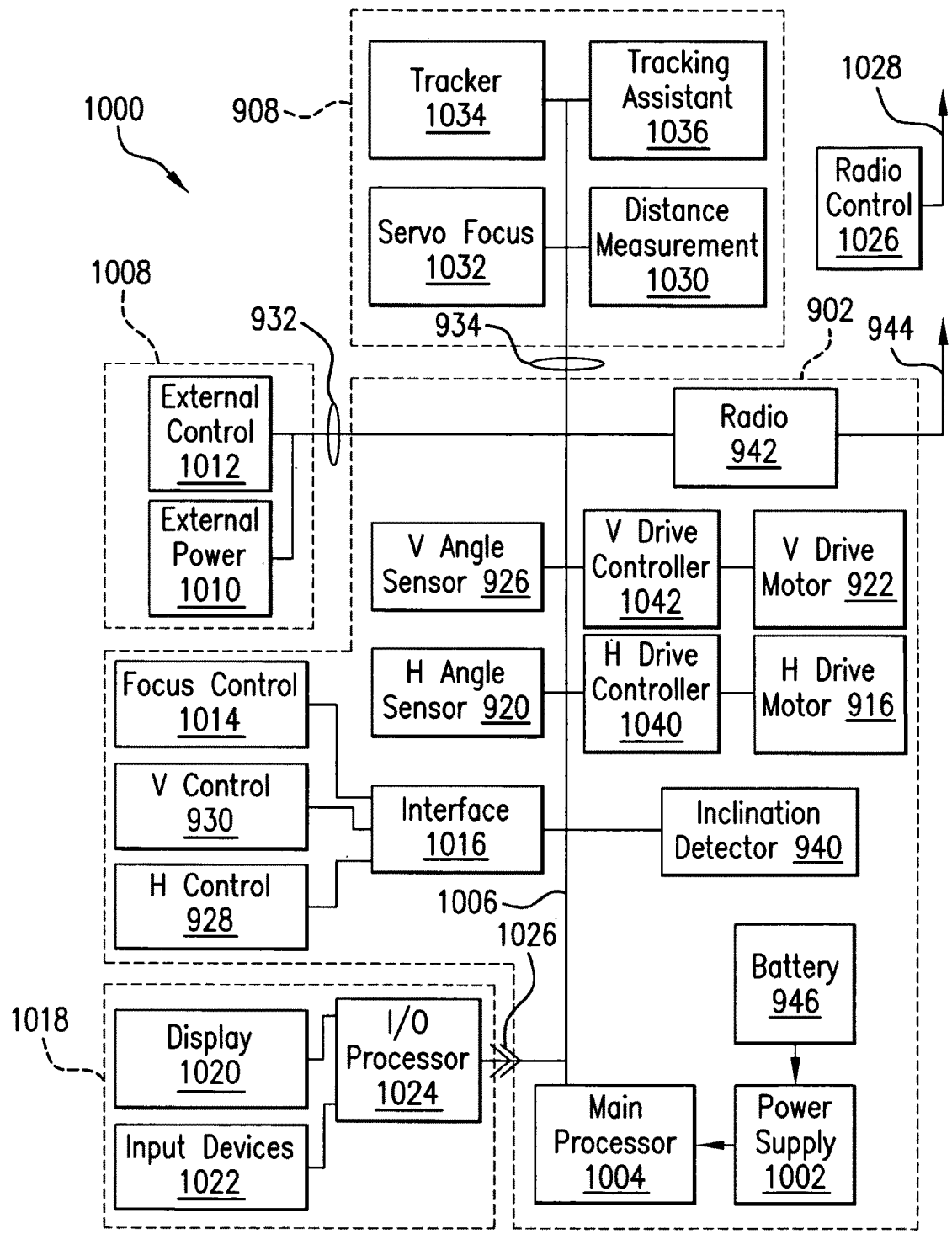
FIG. 10 is a functional block diagram of the total station of FIG. 9.

Referring to FIG. 9, total station 900 has an alidade 902 mounted on an adjustable tribrach 904 for rotation about a support axis 906 which is vertical when alidade 902 is level. A telescope unit 908 having a telescope 910 with an optical centerline (line of sight) 912 is mounted for rotation about an elevation axis 914 orthogonal to support axis 906.

A controllable horizontal drive 916 rotates alidade 902 about support axis 906 in response to control signals. Markings of a graduated ring 918 fixed with respect to tribrach 904 are detected by a horizontal angle sensor 920 as alidade 902 is rotated. A controllable vertical drive 922 rotates telescope unit 908 about elevation axis 914 in response to control signals. Markings of a graduated ring 924 fixed with respect to telescope unit 908 are detected by a vertical angle sensor 926 as telescope unit 908 is rotated. A horizontal control 928 with manually-operable knob and a vertical control 930 with manually-operable knob provide user inputs for control of horizontal drive 916 and vertical drive 922, respectively.

Alidade 902 is rotatable about support axis 906 to any desired angle and telescope unit 920 is rotatable about elevation axis 914 to any desired angle, even angles exceeding 360 degrees, for aiming of telescope 910 at an arbitrarily-positioned external target. Slip rings 932 provide for transmission of power from an external power supply (shown in FIG. 10) to alidade 902 and/or communication of data and commands between alidade 902 and an external control unit (shown in FIG. 10). Slip rings 934 provide for transmission of power from alidade 902 to telescope unit 908 and communication of data and commands between alidade 902 and telescope unit 908.

Alidade 902 includes a handle 936 for easy transport. An optical plummet 938 is provided to facilitate manual positioning of total station 900 over a survey monument or other selected point by either emitting a light beam vertically downward which is coaxial with support axis 906 or viewing through a small telescope at 938 at the selected point. An inclination detector 940, such as described with reference to FIGS. 1-8, supplies a signal representing inclination of alidade 902 in two mutually-orthogonal directions and thus enables setting up the total station so that support axis 906 is plumb and elevation axis is horizontal. If the inclination sensor 940 has the shape of FIGS. 5, 6, 7, it is preferable to mount the sensor instead of the side of the alidade in the center beside the optical plummet 938 and coaxial to the support axis 906 to minimize disturbances during rotation of the instrument.

A radio module 942 with antenna 944 provides for communication of data and commands between total station 900 and an external radio control unit (shown in FIG. 10). A battery 946 is provided to supply electrical power for total station 900. Total station 900 also has a removable control unit with a keypad and/or other input devices and a display screen (shown in FIG. 10).

Referring to the block diagram 1000 of FIG. 10, dashed lines indicate physical units in which the respective elements are arranged. Within alidade 902 is a power supply 1002 connected to battery 946 for powering a main processor 1004 and other elements of the total station. Main processor 1004 includes associated memory, program storage and the like, not shown. Power supply connections are not shown so as not to obscure the functional relationships of components. Power is delivered provided via individual connections from power supply 1002 to components of the total station and/or via a bus such as a universal serial bus (USB) which combines power distribution and data communication. Similarly, communication between main processor 1004 and other components of the total station is via individual connections and/or via a common bus 1006 such a universal serial buses. Slip rings 932 provide electrical connection to an external unit 1008 having a power supply 1010 and/or an external control unit 1012. Slip rings 934 provide for data communication between main processor 1004 and components of telescope unit 908 and for supply of power to components of telescope unit 908. Each of the functional elements is under control of main processor 1004 and can be commanded to transmit measurement results to main processor 1004.

Horizontal control 928, vertical control 930 and a focus control 1014 provide for manual input of commands to set azimuthally orientation of alidade 902, elevation telescope unit 908 and optical focus of telescope 910. The commands are communicated via an interface 1016 to main processor 1004. A removable console 1018 provides a display screen 1020 and input devices 1022 such as a keypad and/or touch screen. Console 1018 serves for communication between a human operator and the total station, enabling manual input of commands and data and display of user menus and data. Console 1018 includes an input/output processor 1024 for managing communication with main processor 1004 and supporting other tasks such as geodetic computations. Console 1018 is connected with main processor 1004 and power supply 1002 by a connector 1026.

Radio module 942 communicates via bus 1006 with main processor 1004 and via antenna 944 with a radio control unit 1026 having an antenna 1028. The total station can be remotely controlled from radio control unit 1026, for example when located at the measurement target.

Telescope unit 908 includes a distance-measurement module 1030, a servo-focus module 1032, a tracker module 1034 and a tracking assistant module 1036.

Distance-measurement module 1030 measures distance from the total station to a target, for example by emitting light toward the target and detecting phase change of the reflected light or by emitting light pulses toward the target and determining time of flight of reflected pulses. Distance-measurement computation is performed in circuitry of distance measurement module 1030 and/or in main processor 1004.

Servo-focus module 1032 provides for controllable focus of the telescope optics, in dependence on signals from main processor 1004 in response to manual adjustment of focus control 1014 and/or in response to auto-focus circuitry within servo-focus module 1032.

Tracker module 1034 enables the total station to automatically aim the telescope at and follow a target as the target is moved. Tracker module 1034 emits a narrow beam of light through the telescope optics. This light, when reflected from a target, is detected by a sensor which sends a tracking signal to main processor 1004 to indicate needed changes of azimuth and elevation.

Tracking assistant module 1036 assists a human operator to place a movable target in the optical axis of the telescope, by emitting lights which are directed so that the human operator sees respective different colors when positioned on one side or the other of the telescope's line of sight.

Azimuthal orientation of alidade 902 is known to main processor 1004 from signals received from horizontal angle sensor 920. Azimuthal orientation of alidade 902 is commanded by signals sent from main processor 1004 to horizontal drive controller 1040. Horizontal drive 916 is responsive to horizontal drive controller 1040 for rotating alidade 902 about support axis 906. Elevation of telescope unit 908 is known to main processor 1004 from signals received from vertical angle sensor 926. Elevation of telescope unit 908 is commanded by signals sent from main processor 1004 to vertical drive controller 1042. Vertical drive 922 is responsive to vertical drive controller 1042 for rotating telescope unit 908 about elevation axis 914.

Main processor 1004 determines the desired azimuth and elevation from one of several sources: manual setting of controls 928 and 930; manual entry of data via input devices 1022; remote commands from radio control unit 1028; and automatic signals from tracker 1036 when the tracking function is enabled.

Figure 11:
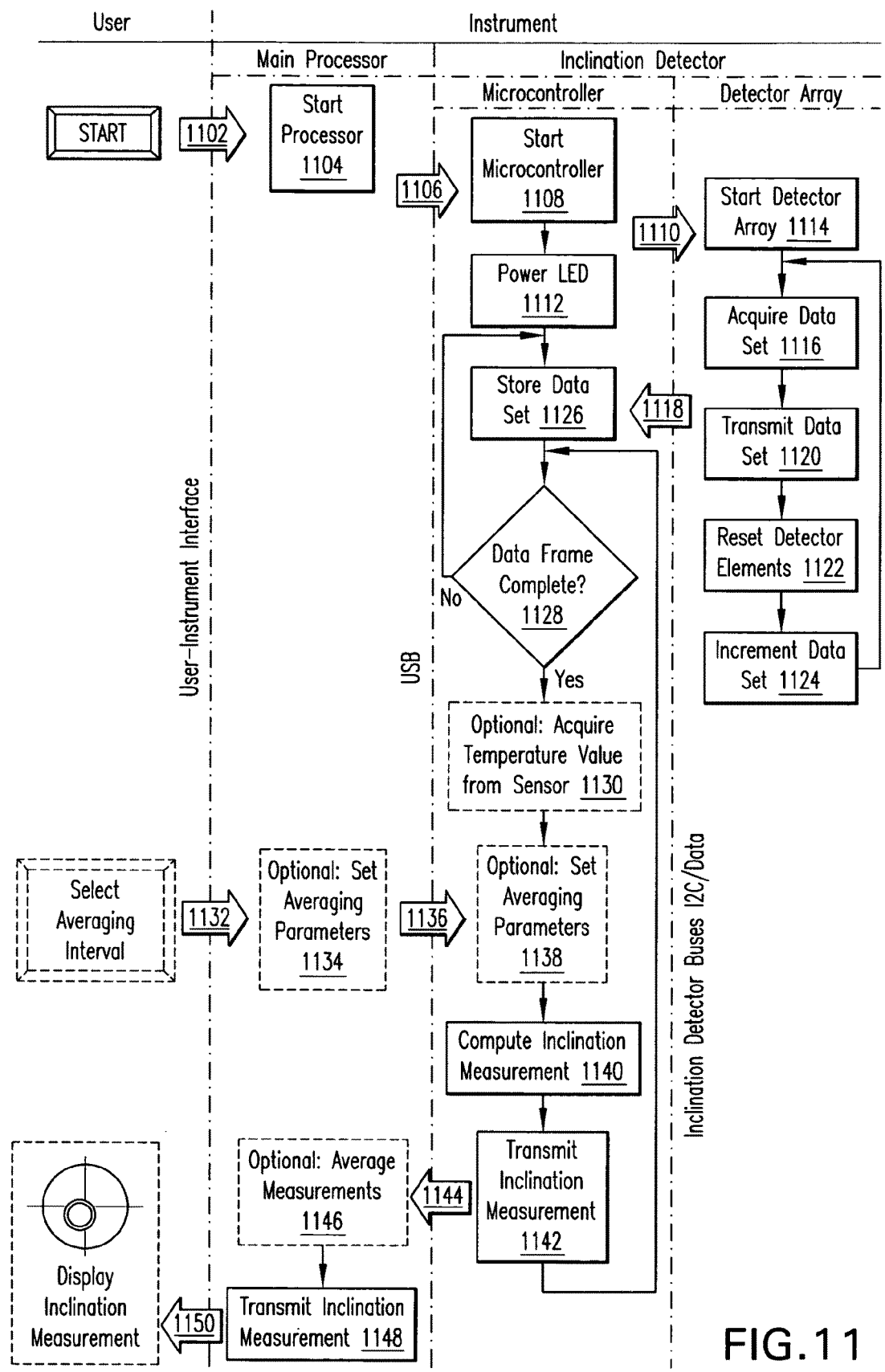
FIG. 11 is a flow chart illustrating operation of an inclination detector and a total station in accordance with embodiments of the invention.

FIG. 11 shows a flow chart 1100 illustrating operation of an inclination detector and a geodetic instrument such as a total station in accordance with embodiments of the invention. To facilitate understanding, the chart of FIG. 11 is divided first between functions performed by a human operator and those performed by the instrument. Functions performed within the instrument are divided between those performed by the instrument's main processor, such as main processor 1004, and those performed by the instrument's inclination detector, such as inclination detector 940. Functions performed within the inclination detector are further divided between those performed by the inclination detector's microcontroller, such as microcontroller 810, and those performed by the inclination detector's detector array, such as detector array 815.

A human operator starts the instrument with a start command 1102. Main processor starts operation at 1104 and sends a command at 1106 to start the microcontroller. The microcontroller starts operation at 1108, sends a command at 1110 to start the detector array, and sends power at 1112 to illuminate the point-source LED. Detector array starts operation at 1114 and begins acquiring a data set at 1116. When a data set has been acquired (for example an A/D value of one photodetector), detector array transmits the acquired data set 1118 at 1120 to the microcontroller. The detector array increments the detector element at 1124. Detector array continues to acquire and transmit data as long as it remains in operation.

Data set 1118 received by microcontroller is stored in memory at 1126. The microcontroller checks at 1128 whether a complete data frame has been acquired (e.g., a full complement of data sets representing a full defocused image of the point-source LED). The microcontroller optionally acquires a temperature value at 1130 to be used in calculating a temperature-corrected inclination measurement. Averaging parameters optionally are provided from human input at 1132 and/or from pre-programmed or default parameters. The main processor optionally sets appropriate parameters at 1134 and/or optionally transmits averaging parameters 1136 to the microcontroller. The microcontroller optionally sets its averaging parameter accordingly.

The microcontroller computes an inclination measurement at 1140, optionally applying a temperature correction and optionally averaging over multiple data sets and/or multiple data frames. The microcontroller transmits at 1142 the computed inclination measurement to the main processor and awaits another frame of data. The main processor optionally averages inclination measurements over a designated time interval at 1146. The main processor transmits inclination measurement signals to a display at 1150. A display screen or other appropriate output device indicates the inclination measurement for information of the human operator.

The angle sensor is designed not only for displaying and storing angle data but also to support the servo system with fast data for angular calculations. In addition, the angle measurement system compensates for the following:

Automatic correction for deviation of the plumb axis.
Automatic correction for collimation errors.
Automatic correction for trunnion axis tilt.
Arithmetic averaging for reducing sighting errors.

Deviations in the plumb axis may occur when one or more of the tripod legs moves as a result of unstable ground or changings in ground viscosity, such as the heating of road tarmac. Corrections for this movement ensure accurate measurements.

Most modern total stations are equipped with a dual-axis compensator that automatically corrects the horizontal and vertical angles for any deviations in the plumb axis caused by mislevelment. In accordance with embodiments of the invention, the level compensator sensor is mounted in the center of the instrument to minimize sensitivity to vibrations and rotation of the instrument. The mounting facilities are preferably designed for the highest stability that can provide an absolute level compensator value, so that the compensator can be active with full accuracy directly after the instrument is powered up. In addition, an automatic procedure can be provided for the routine calibration of the compensator. The calibration process involves establishing a horizontal reference plane relative to the balanced vertical axis of the instrument during a 360-degree rotation of the instrument. The orientation of the reference plane may change slightly with large temperature variations or other mechanical stresses.

In addition to correcting horizontal and vertical angles for mislevelment, the aiming errors caused by mislevelment are corrected in accordance with embodiments of the invention. The mislevelment correction is applied to the servo drive to re-aim the instrument. For example, aim can be corrected when extending a vertical line to ensure that a true vertical line can be obtained. The result is that horizontal and vertical angles are corrected for mislevelment while the instrument is accurately aimed at the correct location. This ability ensures that mislevelment errors are corrected to provide accurate angle measurements.

Collimation errors affecting measured horizontal and vertical angles are also corrected in accordance with embodiments of the invention. The horizontal collimation error is the difference between the line of sight and the plane perpendicular to the trunnion axis; the vertical collimation error is the difference between the vertical circle zero and the plumb axis. Traditionally, collimation errors were eliminated by observing angles on both instrument faces. In accordance with embodiments of the invention, the collimation errors can be predetermined by performing a pre-measurement collimation test. Angular measurements are observed on both instrument faces to enable the collimation errors to be calculated and the respective correction values to be stored in the instrument. The collimation correction values are then applied to all subsequent angle measurements. Angles observed on a single face are therefore corrected for collimation errors, thereby removing the need to measure on both instrument faces. A tracker unit makes it possible to automatically lock and track a target. Since the sighting to the target is performed by the instrument, the effects of horizontal and vertical collimation are similar to those experienced during manual sighting. To correct for the collimation errors in the tracker unit, an autolock collimation test can be performed. The autolock collimation test automatically observes angular measurements to a target on both instrument faces. The autolock collimation errors are then calculated and the respective correction values are stored in the instrument. The autolock collimation correction values are then applied to all subsequent angle measurements observed when autolock is enabled. Angles observed on a single face are therefore corrected for collimation errors, thereby removing the need to measure on both instrument faces.

Trunnion axis tilt error is also automatically corrected in accordance with embodiments of the invention. The trunnion axis tilt error is the difference between the trunnion axis and the plane perpendicular to the plumb axis. The trunnion axis tilt error can be determined by performing a premeasurement trunnion axis tilt test. Angular measurements are observed on both instrument faces to enable the horizontal tilt axis error to be calculated and the respective correction value to be stored in the instrument. The horizontal tilt axis correction value is then applied to all subsequent horizontal angles.

Compensation of aiming for mislevelment can also be performed in accordance with embodiments of the invention. Conventional total stations use a dual-axis compensator to correct the horizontal and vertical angles for the effects of mislevelment. However, the angle correction does not compensate for the aiming error introduced by the mislevelment. In accordance with embodiments of the invention, the tilt sensor output is used to correct not only the horizontal and vertical angles for mislevelment, but also the aiming errors caused by mislevelment. The mislevelment correction is applied to the servo drive to re-aim the instrument to the correct location. The result is horizontal and vertical angles that are corrected for mislevelment while the instrument is still accurately aimed at the correct location.

A limitation of conventional total stations is the ability to extend a vertical line up or down, with the same horizontal angle, by simply moving the vertical control knob. This ability would demand an instrument that is perfectly leveled with all axes perfectly adjusted. In practice, the instrument is turned vertically, the horizontal angle changes slightly. To obtain a true vertical line, the horizontal angle has to be adjusted. In accordance with embodiments of the invention, the compensation and error information are used to automatically adjust the horizontal angle and aiming to a fixed value when the vertical control knob is turned. Therefore, a perfect vertical line can be extended by simply turning the vertical control knob.

Similar to the technique used for extending a vertical line, a traditional way of setting out a horizontal straight line in a direction exactly opposite to a given horizontal direction, is to transit the telescope 180 degrees by simply turning the vertical control knob. With conventional instruments this technique requires a perfectly adjusted axis without horizontal collimation errors for an accurate result. In accordance with embodiments of the invention, the collimation and compensator error information are used to automatically adjust the horizontal angle to a fixed value when the vertical control knob is turned. The horizontal angle is adjusted to provide an accurate straight line direction by turning only the vertical control knob.

Embodiments of the invention may include one or more of the following:

1. Apparatus comprising:
    a. A vessel containing liquid having a reflective surface,
    b. A lens situated in an optical path between the reflective surface and a focal plane of the lens,
    c. A point source to emit light through the lens toward the liquid surface,
    d. A two-dimensional array of detector elements located such that light reflected from the reflective surface passes through the lens onto the detector elements, each detector element producing a value corresponding to amplitude of incident light, and
    e. A processor responsive to the values produced by the detector elements to calculate a center of gravity of the image formed on the detector elements, wherein the calculated center of gravity is dependent on inclination of the vessel.
2. The apparatus of 1, wherein the light forms an image of the point source on the detector elements.
3. The apparatus of 1 or 2, wherein the light source lies substantially within the focal plane of the lens and the array lies substantially out of the focal plane of the lens such that the image formed on the detector elements is a defocused image of the point source.
4. The apparatus of 1 or 2, wherein the array lies substantially within the focal plane of the lens and the light source lies substantially out of the focal plane of the lens such that the image formed on the detector elements is a defocused image of the point source.
5. The apparatus of one of 1-4, wherein at least one of the point source and the two-dimensional array lies substantially out of the focal plane of the lens.
6. The apparatus of one of 1-5, wherein the processor calculates the center of gravity with sub-pixel precision.
7. The apparatus of one of 1-6, where the calculated center of gravity is dependent on inclination of the vessel about two orthogonal axes.
8. The apparatus of one of 1-7, wherein the lens has a non-planar surface in contact with the liquid.
9. The apparatus of one of 1-8, further comprising a prism located in the optical path between the point source and the reflective surface and serving to direct light from the point source toward the liquid surface.
10. The apparatus of 9, wherein the prism serves to direct light from the reflective surface toward the two-dimensional array.
11. The apparatus of one of 1-10, wherein the processor is responsive to values produced by the detector elements which exceed a threshold for calculating the center of gravity of the image formed on the detector elements.
12. The apparatus of one of 1-11, further comprising a sensor producing a signal dependent on ambient temperature, and wherein the processor is responsive to the signal for applying a temperature correction when calculating the center of gravity of the image formed on the detector elements.
13. The apparatus of one of 1-12, wherein the processor is responsive to the values produced by the detector elements over a predetermined time interval to calculate a center of gravity of the image formed on the detector elements averaged over the predetermined time interval.
14. The apparatus of 13, wherein the processor is responsive to user selection of the predetermined time interval.
15. The apparatus of one of 1-14, wherein the processor controls emission of light from the point source.
16. The apparatus of one of 1-15, wherein the detector elements comprise CMOS photodiodes.

17. The apparatus of one of 1-16, further comprising a base, an alidade mounted on the base for rotation about a support axis, and a telescope unit rotatably mounted on the alidade for rotation about an elevation axis.

18. The apparatus of 17, further comprising an azimuth sensor for detecting rotational orientation of the alidade and an elevation sensor for detecting rotational orientation of the telescope unit.

19. The apparatus of 18, further comprising a processor responsive to the azimuth sensor and to the elevation sensor for generating rotation control signals, and drives responsive to the rotation control signals for orienting the alidade and the telescope unit.

20. The apparatus of one of 18 or 19, wherein the processor uses the calculated center of gravity to determine at least one of: (i) a correction for deviation from plumb of an axis of the apparatus, and (ii) a correction for collimation errors.

21. The apparatus of 19, wherein the processor uses the calculated center of gravity to determine at least one of: (i) an aiming compensation, (ii) a vertical line extension, and (iii) a horizontal line extension.

22. The apparatus of one of 17-19, wherein the telescope unit comprises a distance measurement module for measuring distance to a target remote from the apparatus.

23. The apparatus of one of 17-20, wherein the telescope unit comprises a telescope and a servo focus module for optical focusing of the telescope.

24. The apparatus of one of 17-21, wherein the telescope unit comprises a tracker for detecting orientation of the telescope unit relative to a remote target and wherein the processor is responsive to the tracker for generating rotation control signals to orient the alidade and the telescope unit such that the telescope unit maintains the remote target along an optical path of the telescope.

25. The apparatus of 22, further comprising a radio for communicating information between the processor and a remote control unit.

26. The apparatus of 23, further comprising at least one input device and at least one display.

27. A method of determining inclination comprising:
    a. Emitting light from a point source through a lens toward a reflective liquid surface contained in a vessel;
    b. Detecting light incident on an array of detector elements which is reflected from the liquid surface and passes through the lens to form a defocused image of the point source on the array to acquire data representing detected intensity of the light incident on each of the detector elements;
    c. Determining a center of gravity from the data, the center of gravity representing inclination of the vessel 28. The method of 25, further comprising acquiring a temperature value representing ambient temperature and wherein determining a center of gravity from the data comprises applying the temperature value to determine a center of gravity which is corrected for ambient temperature.

29. The method of one of 25-26, wherein detecting light to acquire data comprises acquiring data in data sets and collecting multiple data sets to obtain a frame of data, and wherein determining a center of gravity comprises computing a center of gravity from a frame of data.

30. The method of one of 25-27, wherein determining a center of gravity comprises averaging data acquired over a selected time interval.

31. The method of one of 25-28 further comprising generating a display of the center of gravity as a representation of inclination of the vessel about two orthogonal axes.

32. The method of 26, further comprising correcting tilt sensitivity for ambient temperature.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

While embodiments and applications in accordance with the invention have been shown and described, it will be apparent to those skilled in the art having the benefit of this disclosure that many more modifications than mentioned above are possible without departing from the inventive concepts herein. The invention, therefore, is not to be restricted except in the spirit of the appended claims.

The invention claimed is:
1. Apparatus comprising:
    a. a vessel containing liquid having a reflective surface and an index of refraction which changes with temperature,
    b. a lens situated in an optical path between the reflective surface and a focal plane of the lens,
    c. a point source to emit light through the lens toward the liquid surface,
    d. an array of detector elements located such that light reflected from the reflective surface passes through the lens onto the detector elements, each detector element producing a value corresponding to amplitude of incident light,
    e. a processor responsive to the values produced by the detector elements to calculate a center of gravity of the image formed on the detector elements, wherein the calculated center of gravity is dependent on inclination of the vessel, and
    f. a sensor producing a signal dependent on ambient temperature,
wherein the processor is responsive to the signal for applying a temperature correction which compensates for changes in the index of refraction of the liquid when calculating the center of gravity of the image formed on the detector elements.

2. The apparatus of claim 1, wherein the light forms an image of the point source on the detector elements.

3. The apparatus of claim 1, wherein the light source lies substantially within the focal plane of the lens and the array lies substantially out of the focal plane of the lens.

4. The apparatus of claim 1, wherein the array lies substantially within the focal plane of the lens and the light source lies substantially out of the focal plane of the lens.

5. The apparatus of claim 1, wherein at least one of the point source and the array lies substantially out of the focal plane of the lens.

6. The apparatus of claim 1, wherein the processor calculates the center of gravity with sub-pixel precision.

7. The apparatus of claim 1, where the calculated center of gravity is dependent on inclination of the vessel about two orthogonal axes.

8. The apparatus of claim 1, wherein the lens has a nonplanar surface in contact with the liquid.

9. The apparatus of claim 1, further comprising a prism located in the optical path between the point source and the reflective surface and serving to direct light from the point source toward the liquid surface.

10. The apparatus of claim 9, wherein the prism serves to direct light from the reflective surface toward the array.

11. The apparatus of claim 1, wherein the processor is responsive to values produced by the detector elements which exceed a threshold for calculating the center of gravity of the image formed on the detector elements.

12. The apparatus of claim 1, wherein the processor is responsive to the values produced by the detector elements over a predetermined time interval to calculate a center of gravity of the image formed on the detector elements averaged over the predetermined time interval.

13. The apparatus of claim 12, wherein the processor is responsive to user selection of the predetermined time interval.

14. The apparatus of claim 1, wherein the processor controls emission of light from the point source.

15. The apparatus of claim 1, wherein the detector elements comprise CMOS photodiodes.

16. The apparatus of claim 1, further comprising a base, an alidade mounted on the base for rotation about a support axis, and a telescope unit rotatably mounted on the alidade for rotation about an elevation axis.

17. The apparatus of claim 16, further comprising an azimuth sensor for detecting rotational orientation of the alidade and an elevation sensor for detecting rotational orientation of the telescope unit.

18. The apparatus of claim 17, wherein the processor is responsive to the azimuth sensor and to the elevation sensor for generating rotation control signals, and drives responsive to the rotation control signals for orienting the alidade and the telescope unit.

19. The apparatus of claim 17, wherein the processor uses the calculated center of gravity to determine at least one of: (i) a correction for deviation from plumb of an axis of the apparatus, and (ii) a correction for collimation errors.

20. The apparatus of claim 18, wherein the processor uses the calculated center of gravity to determine at least one of: (i) an aiming compensation, (ii) a vertical line extension, and (iii) a horizontal line extension.

21. The apparatus of claim 16, wherein the telescope unit comprises a distance measurement module for measuring distance to a target remote from the apparatus.

22. The apparatus of claim 16, wherein the telescope unit comprises a telescope and a servo focus module for optical focusing of the telescope.

23. The apparatus of claim 16, wherein the telescope unit comprises a tracker for detecting orientation of the telescope unit relative to a remote target and wherein the processor is responsive to the tracker for generating rotation control signals to orient the alidade and the telescope unit such that the telescope unit maintains the remote target along an optical path of the telescope.

24. The apparatus of claim 23, further comprising at least one of: a radio for communicating information between the processor and a remote control unit, an input device and a display.

* * * * *